Feb. 18, 1969  W. M. ROBERTS  3,427,744
FISHING LURE
Filed Aug. 16, 1966

INVENTOR.
William M. Roberts
BY
Jennings, Carter & Thompson
ATTORNEYS

United States Patent Office 3,427,744
Patented Feb. 18, 1969

3,427,744
FISHING LURE
William M. Roberts, 32 Euclid Ave.,
Winchester, Ky. 40391
Filed Aug. 16, 1966, Ser. No. 572,740
U.S. Cl. 43—42.05
Int. Cl. A01k 85/00
3 Claims

ABSTRACT OF THE DISCLOSURE

A fishing lure formed of molded, elastic plastic body, having the texture, color and feel of a live bait. In one side of the body of the lure is a slot for receiving a hook, and seated in the body of the lure, just below the slot is a metal counterweight with upturned ends extending upwardly into the slot, the upturned forward end of the counterweight being bent backwards to overhang the main portion thereof and the rear end thereof being notched to receive the shank of the hook. A line is secured to the eye of the hook and passes through a hole in the forward end of the counterweight and in the forward end of the body. The sides of the slot grip the shank of the hook and conceal all but the bend and point of the hook.

---

This invention relates to a fishing lure of the so-called weedless type adapted for casting, spinning or trolling and which includes a number of novel features not found in lures with which I have heretofore been familiar.

The principal objects of my invention are:

(a) to provide a lure having improved weedless performance and having the appearance, feel and texture of a live bait;

(b) to provide a lure in which the line extends through the body of the lure and in which the hook separates from the body when a fish is hooked, leaving the body of the lure to slide freely along the line;

(c) to provide means to hold the hook in a fixed position relative to the body of the lure with the hook extending upwards when being fished and to secure the hook against being turned flat against the body of the lure when a fish strikes; and (d) to provide means for effecting a rotary motion to the rear or tail section of the lure and a laterally wiggling, or swimming motion to the lure body as it is retrieved.

Briefly, my improved lure is formed of a molded, elastic, plastic body, having the texture, color and feel of a live bait fish, worm, frog or other live bait. The composition of the plastic body may vary, and forms no part of my invention, but I do find that the texture, color and feel, have an importance in attracting fish and cause them to hold on to the lure after striking it. Formed in one side of the body of the lure is a slot for receiving a hook, and seated in the body of the lure just below the slot is a metal counterweight with upturned ends extending upwardly into the slot in the body of the lure, the upturned end at the forward end of the counterweight being bent backwards to overhang the main portion thereof and the rear end thereof being notched to receive the shank of the hook.

When mounting the hook in the body of the lure it is held point upwards and is pushed forward slightly so that the eye of the hook is engaged by the backwardly bent notched forward end of the counterweight. This holds the hook against being turned flat against the side of the body. A line is secured to the eye of the hook and passes through a hole in the forward end of the counterweight and in the forward end of the body. The body being formed of an elastic plastic composition, the sides of the slot grip the shank of the hook and conceal all but the bend and point of the hook.

The rear, or tail portion of the lure is separated from the body and is connected thereto by a swivel. The tips of the tail are bent outward helically to cause the tail portion to rotate as it is retrieved through the water. The swivel connecting the tail portion of the lure is turned slightly to one side of the long axis of the body of the lure and thus effects a lateral wobbling or swimming action to the lure as it is retrieved. When a fish strikes the lure and is hooked, the hook separates from the body and the body of the lure is free to slide along the line. This is very important in fishing for bass which frequent grassy, weedy spots. In fishing with an ordinary lure, the body of the lure may be dragged into the weeds and grass by a hooked fish where it may hang, causing the fish to become unhooked. Even more important, the line sliding freely through the lure makes it impossible for the hooked fish to jump and use the weight of the lure to throw the hook.

A lure embodying features of my invention is illustrated in the accompanying drawing, forming a part of this application in which FIG. 1 is a perspective view showing the hook in place for fishing, and showing the hook in dotted lines separated from the body as when a fish is hooked;

Figure 1:
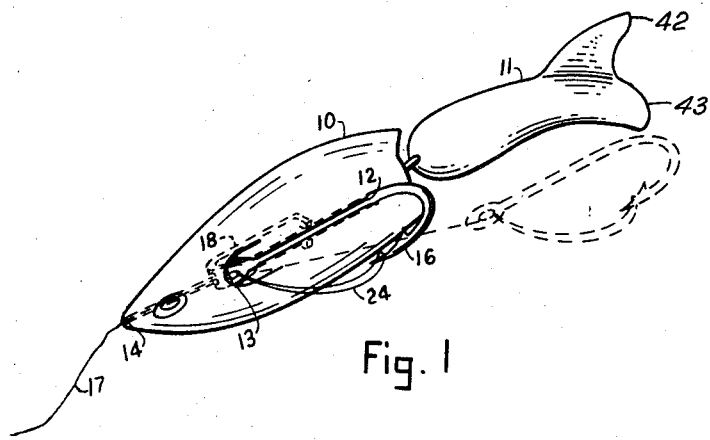

Referring to the drawing for a better understanding of my invention, I show, in FIG. 1, my improved lure having a body portion 10 and a tail portion 11. Both the body portion and the tail portion of the lure are preferably molded from an elastic, plastic composition having the texture, color and feel of a live bait fish. While many such compositions will suggest themselves to those skilled in the art, I have found that a polyvinyl chloride composition is satisfactory, the desired color being incorporated in the plastic composition before the lure is molded.

As will be seen, the lure illustrated resembles a live bait fish in appearance. It will be apparent, however, that it may take the form of other live baits. Provided in the body portion of the lure is a longitudinal slot 12 which terminates in a recess 13 shortly to the rear of what might be termed the head portion of the lure. From the recess 13 a narrow passage 14 extends through the head of the lure. The slot 12 receives a hook 16 with the eye of the hook terminating in the recess 13. A fishing line 17 is secured to the eye of the hook and extends out through the passage 14.

Embedded in the lure is a metal counterweight 18 to insure that the lure when being fished will always travel with the hook 16 extending upwardly therefrom. The counterweight 18 determines the buoyancy of the lure. It will be understood that it may be made to float or sink in water. I have found in fishing the lure, that the depth at which it will run depends on the speed of retrieve. The counterweight 18 is embedded in the body of the lure under the forward end of the slot 12. The rear end of the counterweight is turned up, as shown at 19 and protrudes into the slot 12 and is notched at 21 to receive the shank of the hook 16. The forward end of the counterweight 18 is turned up to protrude into the recess 13 and is turned rearwardly to overhang as shown at 22. It is provided with an opening 23 to permit passage of the line 17 out through the passage 14.

When the hook 16 is in position in the slot 12, the eye of the hook is received under the rearwardly overhanging portion 22 of the counterweight. This prevents the hook from turning over against the side of the lure when being fished. The body of the lure being of an elastic plastic composition the slot 12 is preferably made narrow enough that the sides grip the hook yieldingly when it is in place. While any approved style of hook may be employed, my improved lure being especially designed for fishing in weeds and grass, I prefer to employ a weedless type, as shown with a weed guard 24.

Figure 2:
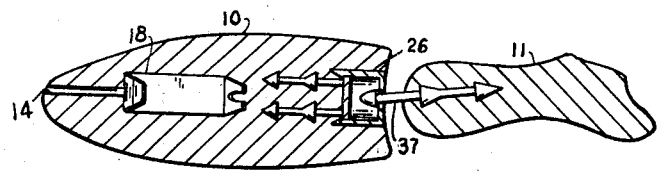
FIG. 2 is a plan view of the lure, partly in section.
Figure 3:
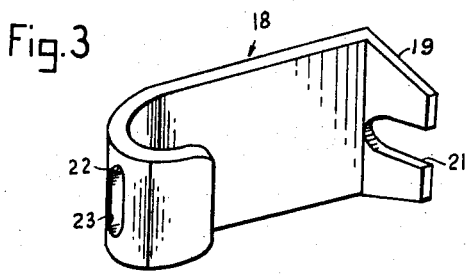
FIG. 3 is a detail perspective view of a counterweight embodied in the lure.
Figure 5:
FIG. 5 is a detail view of the conical rotary element of swivel.
Figure 4:
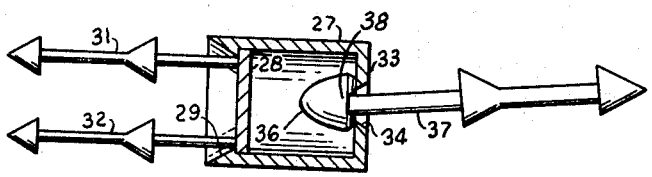
FIG. 4 is a detail sectional view of the swivel connecting the tail portion of the lure to the body portion.
Figure 6:
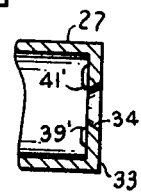
FIG. 6 is a detail view of a modified form of the swivel housing.

The tail portion 11 of the lure is connected to the body portion by means of a relatively hard "nylon" or similar plastic swivel 26 shown in detail in FIGS. 4, 5 and 6 of the drawing. The swivel 26 is comprised of a cylindrical housing member 27 having a cover 28 which is held in place by an inwardly turned flange 29 in the cylindrical member. The parts being elastic and somewhat flexible the cover is snapped in place in the cylindrical member. Two anchor members 31 and 32 are formed integrally with the cover 28 and extend into the body of the lure as shown in FIG. 2. It will be understood that the body of the lure is molded over the cylindrical member 27 so that it is firmly held in place.

Formed integrally with the cylindrical member 27 is a bottom 33 having a central outwardly flaring opening 34. Inserted through the flaring opening 34 is a somewhat conical-shaped swivel member 36 having an anchor stem 37 which extends out through the opening 34 and is molded into the tail portion 11 of the lure. The base 38 of the member 36 is wider than the opening 34 and the elasticity of the material and the conical shape of the member 36 permits the member 36 to be inserted through the opening 34 into the cylindrical member when the lure is being assembled. Once inserted it requires considerably more force to separate them.

On one side of the base 38 of the conical member 36 is one or more protruberances 39 and on the opposite side are one or more larger protruberances 41 which bear against the bottom 33 when the lure is being fished. See FIG. 5. These cause the anchor member 37 and tail portion 11 of the lure to assume a position slightly at an angle to one side of the long axis of the body of the lure.

Instead of forming the protruberances 39 and 41 on the conical member 36, I may provide similar protruberances 39' and 41' on the inner side of the bottom 33 of the housing member 27 as shown in FIG. 6.

The tail portion 11 of the lure is provided with tail fins 42 and 43 which are turned outward spirally to cause the tail portion to rotate as the lure is retrieved. Being at an angle to the long axis of the body of the lure the tail portion of the lure thus, in addition to rotating, has a side to side life-like motion as it is drawn through the water and imparts a side to side realistic swimming action to the lure body.

From the foregoing the advantages of my improved lure will be readily apparent. The lure may be cast into grassy and weedy water and the counterweight 18 causes the lure to assume a position with the hook 16 uppermost where there is the least possibility of its engaging the grass and weeds. As the lure is retrieved the tail portion 11 rotates and has a side to side life-like motion which attracts fish. When a fish strikes and is hooked, the hook 16 leaves the slot 12 and the fish can run with the hook leaving the body of the lure behind, as indicated in dotted lines in FIG. 1 of the drawing, the line 17 passing freely through the passage 14. In this way, the body of the lure stays behind as the fish is played and there is much less danger of the fish becoming unhooked.

What I claim is:
1. A fishing lure comprising
   (a) a body portion having a longitudinal slot in one side thereof terminating in a recess at the forward end thereof and with an opening extending from the recess through the forward end of the body portion,
   (b) a hook detachably seated in the longitudinal slot,
   (c) a line secured to the hook and extending through the opening in the forward end of the body portion,
   (d) means in the body to secure the hook against being turned to lie flat against the body,
   (e) a tail portion of the lure rotatably connected to the body,
   (f) a counterweight embedded in the body of the lure to cause the lure when in the water to assume a position with the longitudinal slot extending upwardly to the rear, and
   (g) a rearward upturned notched end on the counterweight protruding into the slot and a forward upturned rearwardly overhanging end protruding into the recess for receiving the hook, the forward upturned end fitting over the eye of the hook when the hook is seated in the slot.

2. A fishing lure as defined in claim 1 in which the body of the lure is made of an elastic plastic composition having the color, texture and feel of a live fish and in which the said composition has the property to grip the shank of the hook concealing all but the point and bend thereof when the hook is seated in the slot.

3. A fishing lure as defined in claim 1 in which the forward upturned end of the counterweight is provided with an opening through which the line passes.

References Cited
UNITED STATES PATENTS

| | | | |
|---|---|---|---|
| 1,522,185 | 1/1925 | Hawes | 43—42.16 |
| 1,836,372 | 12/1931 | Jordan | 43—42.14 X |
| 2,528,861 | 11/1950 | Clasen et al. | 43—42.05 |
| 2,587,366 | 2/1952 | Montali | 43—42.16 |
| 2,822,638 | 2/1958 | Warterfield | 43—42.16 |

SAMUEL KOREN, *Primary Examiner.*

DANIEL J. LEACH, *Assistant Examiner.*

U.S. Cl. X.R.

43—42.16, 42.39